United States Patent
Smith et al.

(10) Patent No.: US 9,847,634 B2
(45) Date of Patent: Dec. 19, 2017

(54) PROVIDING PROTECTION AGAINST ARC-FLASH IN A GENSET

(71) Applicants: Cummins Power Generation IP, Inc., Minneapolis, MN (US); Cummins Power Generation Ltd. (UK), Ramsgate (GB)

(72) Inventors: Jacob W. Smith, Fridley, MN (US); Brian B. Brady, Fridley, MN (US); Glaucio G. De Oliveira, Maple Grove, MN (US); Ahmed Nazmul Jaffer, Minneapolis, MN (US); Richard Meadows, Canterbury (GB)

(73) Assignees: Cummins Power Generation IP, Inc., Minneapolis, MN (US); Cumming Power Generation Ltd. (UK), Ramsgate (GB)

( * ) Notice: Subject to any disclaimer, the term of this patent is extended or adjusted under 35 U.S.C. 154(b) by 0 days.

(21) Appl. No.: 15/120,406

(22) PCT Filed: Feb. 19, 2015

(86) PCT No.: PCT/US2015/016637
§ 371 (c)(1),
(2) Date: Aug. 19, 2016

(87) PCT Pub. No.: WO2015/127093
PCT Pub. Date: Aug. 27, 2015

(65) Prior Publication Data
US 2017/0070043 A1    Mar. 9, 2017

Related U.S. Application Data

(60) Provisional application No. 61/942,955, filed on Feb. 21, 2014.

(51) Int. Cl.
H02H 7/06 (2006.01)
H02H 5/12 (2006.01)
(Continued)

(52) U.S. Cl.
CPC ............... H02H 7/06 (2013.01); H02H 3/08 (2013.01); H02H 5/12 (2013.01); H02P 29/02 (2013.01)

(58) Field of Classification Search
CPC ...................................................... H02H 7/06
(Continued)

(56) References Cited

U.S. PATENT DOCUMENTS

| 5,390,068 | A | 2/1995 | Schultz et al. | |
| 8,213,144 | B2 * | 7/2012 | Papallo | G06F 1/12 361/63 |

(Continued)

FOREIGN PATENT DOCUMENTS

| EP | 2 424 059 | 2/2012 |
| KR | 101332672 | 11/2013 |

OTHER PUBLICATIONS

International Search Report and Written Opinion for PCT/US2015/06637, dated May 29, 2015, 9 pages.
(Continued)

*Primary Examiner* — David S Luo
(74) *Attorney, Agent, or Firm* — Foley & Lardner LLP (57) ABSTRACT

An arc flash protection device including a sensor, a timer, and a controller. The sensor is configured to detect a presence of at least one entity or arc flash protection qualifying event in proximity to the generator set. The controller is configured to initiate an arc flash protection regime when the presence of the at least one person or arc flash protection qualifying event is detected in proximity to the generator set.
(Continued)

The arc flash protection regime includes shutting down the generator set automatically upon detection of a short circuit.

15 Claims, 8 Drawing Sheets

(51) Int. Cl.
  *H02P 29/02* (2016.01)
  *H02H 3/08* (2006.01)
(58) Field of Classification Search
  USPC .................................... 318/34, 558; 361/20
  See application file for complete search history.

(56) References Cited

U.S. PATENT DOCUMENTS

| | | |
|---|---|---|
| 2006/0114630 A1 | 6/2006 | Culligan et al. |
| 2007/0208981 A1 | 9/2007 | Restrepo et al. |
| 2010/0033922 A1 | 2/2010 | Zwinger et al. |

OTHER PUBLICATIONS

United Kingdom Search Report for British Patent Application No. GB1419729.7, dated Aug. 14, 2015, 3 pages.
Extended European Search Report for European Application No. 15751413.4, dated Oct. 11, 2017, 7 pages.

* cited by examiner

| Type | System name | Logical Values | Enumeration values or Parametric Name | Default Value | Make Available for HMI | Make Available for Mod bus | Make Available for Impower | Make Available for Engineering tool |
|---|---|---|---|---|---|---|---|---|
| mon | AmpSentry Maintenance Mode Status | 2073 | -Inactive<br>-Active | inactive | yes | read only | yes | yes |
| enum (Volatile) | AmpSentry Maintenance Mode Disable Override | 2074 | -Disable<br>-Enable | disable | yes | read only | yes | yes |
| trim | MM Disable Walkaway Time Delay | 2075 | seconds 1 16U | 300 | yes | read only | yes | yes |
| mon | AMM Disable Walkaway Timer Value | 2076 | seconds 1 16U | 0.0 | no | read only | no | yes |
| mon | AMM PC Tool Detected | 12632 | 0 – Inactive<br>1 - Active | inactive | no | yes | no | yes |
| trim | AMM In Auto (Configurable Input Function Pointer) | | | | yes | no | yes | yes |

PROVIDING PROTECTION AGAINST ARC-FLASH IN A GENSET

CROSS-REFERENCE TO RELATED APPLICATIONS

The present application is a U.S. national stage application claiming the benefit of International Application No. PCT/US2015/016637, filed on Feb. 19, 2015. International Application No. PCT/US2015/016637 claims the benefit of and priority to U.S. Provisional Patent Application No. 61/942,955, filed Feb. 21, 2014. Both applications are incorporated herein by reference in their entirety.

FIELD

This disclosure relates to devices and methods for providing protection against arc flash for a generator set.

BACKGROUND

Generator sets (hereinafter also referred to as "gensets") and the electrical power systems they supply are subject to faults including short circuits. A short circuit in a genset or the circuits that it supplies can produce ionization of the air surrounding the site of the fault, sufficient to cause conduction through the air and forming an electric arc. An arc flash is a phenomenon in which light and heat are produced from an electric arc having enough electrical energy to produce substantial damage. An arc flash can result when a short circuit condition occurs that is sufficient to ionize the air in the compartment. The arc flash can cause vaporization of components, pressure waves, and can even ignite objects in proximity to the genset.

Protecting users from faults such as arc flashes is important in order to enhance system safety and reduce the risk of injury to individuals when in proximity to the genset or other power system components. Individuals are particularly vulnerable to injury from the genset when performing maintenance or investigating possible causes of faults within the genset or its electrical environment. In particular, a maintenance worker may need to perform commissioning, diagnostic, or prognostic activities in close proximity to the genset. If a short circuit occurs, such an individual may be injured. In addition, other situations involving people or objects in proximity to a genset or its associated equipment may occur where protection from arc flash would be desired. Further, providing such protective mechanisms can also reduce the risk of damage to the generating set and its associated power system.

SUMMARY

Various embodiments include methods and apparatus for arc flash protection for a generator set. The arc flash protection device comprises detecting the presence of at least one person or event qualifying for arc flash protection in proximity to the generator set or associated equipment and initiating a protection regime when the presence of the at least one person or qualifying arc flash protection event is detected in proximity to the generator set or associated equipment. The protection regime comprises shutting down power generation in the generator set automatically upon detection of a short circuit. Shutting down the generator set can include, but is not limited to, one or more of shutting off fuel to the genset engine; turning of a spark ignition system; shutting off a source of combustion air; shutting off an alternator field or otherwise removing excitation to stop power generation in the alternator; controlling an automatic voltage regulator of the genset; turning off an inverter output stage of a variable speed generator having an engine, variable speed alternator, and inverter; and opening an automatic transfer switch or circuit breaker coupled to the genset.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

The subject matter of the present application has been developed in response to the present state of the art, and in particular, in response to the problems and needs in the art that have not yet been fully solved for gensets. Gensets are unique in that they have direct control over local power production and have multiple ways in which to disable power production and to detect personnel in close proximity to the gensets themselves. One problem associated with gensets and other commercial electrical equipment, as noted above, is their susceptibility to arc flashes induced by short circuits. Accordingly, the subject matter of the present application has been developed to provide systems and methods that provide protection against arc flash.

Figure 1:
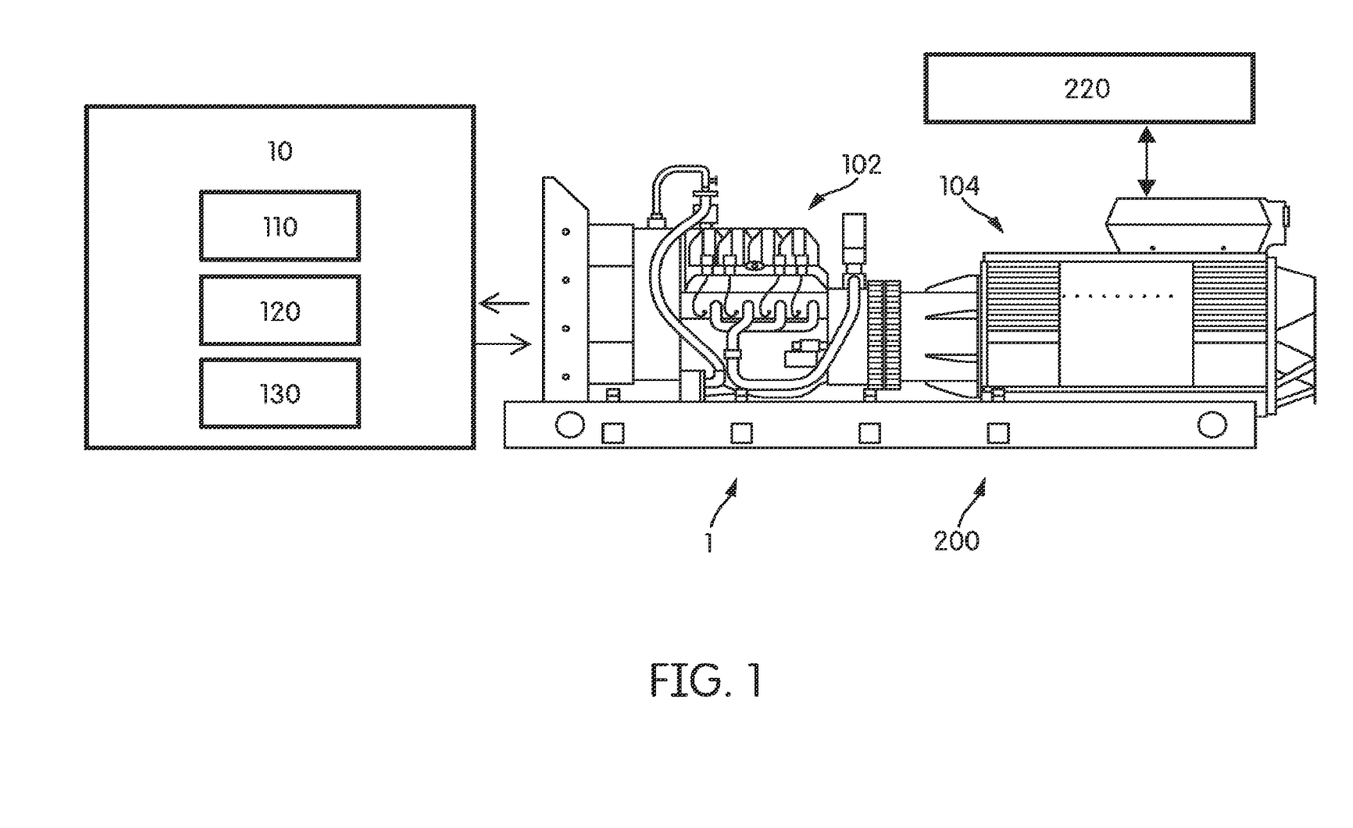
FIG. 1 is a block diagram of an apparatus including a genset and an arc flash protection device, according to an embodiment.

FIG. 1 is a schematic block diagram of an apparatus 1 for providing protection against arc flash for a genset, according to one embodiment. As shown in FIG. 1, the apparatus 1 includes a genset 200 which is connected to an arc flash protection device 10. The arc flash protection device 10 and the genset 200 are configured to communicate with each other. The genset 200 comprises an engine 102 or other prime mover that is coupled to an alternator 104, a genset controller (not shown), and an automatic voltage regulator (hereinafter referred to as an "AVR") 220 to control the alternator field, and thus the output voltage and current of the alternator 104. It is noted that gensets 200 can come in multiple phase configurations, with single phase, two phase, and three phase outputs being the most common. Direct current (DC) and variable speed gensets with direct or inverter outputs are also known. The arc flash protection device 10 comprises a controller 110 and a sensor 130. In some embodiments, the arc flash protection device 10 is integrated within the genset 200.

In the embodiment shown in FIG. 1, the controller 110 is configured to implement an arc flash protection regime for the genset 200. The controller 110 can be configured to communicate with both the sensor 130 and the genset 200, for example, to facilitate the arc flash protection of the genset 200. In particular, the controller 110 is configured to employ data collected by the sensor 130 relating to a proximity of a person to be afforded arc flash protection with respect to the genset 200. Alternatively, the controller 110 can detect manual inputs to the genset control panel or other controls or inputs, such as the use of a plug-in diagnostic tool, to detect the proximity of personnel to the genset 200. The sensor 130 is also not limited to detecting a presence of such a person in proximity to the genset 200 and can collect other types of information that may be used by the controller 110 or used for other purposes, such as gathering data as part of an operational analysis. The sensor 130 or controller 110 can also be configured to detect other events or entities that can be afforded arc flash protection by implementation of the arc flash protection regime in the genset and/or associated electrical equipment, other than the proximity to a person.

More particularly, the sensor 130 is configured to sense whether an entity such as a person or an animal or other entity to be afforded arc flash protection is in proximity to the genset 200. The sensor 130 can be configured to detect a presence of such an entity, or multiple entities, within a predetermined distance of the genset 200 and/or its associated electrical equipment. The predetermined distance may be determined in regards to a specific operational configuration of the genset 200 or based on known working conditions for employees who work directly on the genset 200, for example. Such a predetermined distance can be adjusted by a threshold or margin so as to be larger than a likely actual distance.

When the sensor 130 detects the presence of such an entity in proximity to the genset 200 (for example, within a distance of 15 feet from the generator) or the controller detects the presence of personnel through input to the genset controls or through the usage of a plug-in diagnostic control, the controller 110 is configured to initiate an arc flash protection regime. Upon initiation of the protection regime, the controller 110 is configured to cause the genset 200 to be shut down immediately if a short circuit is detected. Such a control serves to prevent a worker close to the genset 200 (or other at risk event or entity) from being injured by the arc flash that may accompany a short circuit. After the genset 200 is shut down, the genset 200 remains off until the cause of the fault has been investigated and the fault cleared. In yet another embodiment, the engine of the genset is allowed to continue to spin the alternator for a period of time after an arc flash initiated shut down to cool the alternator. In this condition, the field of the alternator is not powered and/or the alternator outputs are disconnected such that no power generation occurs, and no continuing arc flash is possible.

It is noted that in embodiments of the present invention, shutting down the genset—whether to prevent thermal damage or to prevent an arc flash event—can include, but is not limited to, one or more of shutting off fuel to the genset engine; turning of a spark ignition system; shutting off a source of combustion air; shutting off an alternator field or otherwise removing excitation to stop power generation in the alternator; controlling an automatic voltage regulator of the genset; turning off an inverter output stage of a variable speed generator having an engine, variable speed alternator, and inverter; and opening an automatic transfer switch or circuit breaker coupled to the genset.

Arc flash events, however, are often difficult to differentiate from nea circuit events, such as current in-rush due to industrial motor starts, or other large current events. A short circuit is considered an abnormal system event and can create an arc flash. Motor in-rush (or load in-rush in general), while large, is considered a normal system event even though it may resemble a short circuit, particularly, if the load is sized closely to the generator set's rated size. Alternators of gensets can generally source current into these events at greater than a rated output for a short time (an "overcurrent" condition) until they reach a physical thermal limit and must then be shut down or output scaled back to prevent alternator damage. However, gensets are unique in electrical equipment that can experience arc flash in that they control much, if not all of the power being sourced into the arc flash event. A genset thermal protection regime for protecting a genset or alternator, such as the genset 200 described above, can be developed based on analysis and modeling of the thermal and electro-mechanical performance of a genset, and can also incorporate various considerations. The genset protection regime (often also referred to as a genset overcurrent protection or thermal protection) for certain embodiments can be developed based on requirements such as regulations in a particular jurisdiction, grid code, or industry standards. Such standards may impose requirements for the genset to "ride through" and survive under continuous operation during short circuits and other specific events, so long as the thermal limit has not been reached and damage about to occur. An arc flash protection regime, by contrast, immediately places the genset into shut down so as to protect personnel or other protection qualifying event that may be in close proximity from a potential arc flash. However, as noted above, there are times when a known or anticipated large current draw (such as a large motor starting in-rush) needs to be allowed by the genset 200, and the arc flash protection regime or mode needs to be allowed to be manually overridden even though personnel that would normally be afforded arc flash protection are detected within close proximity to the genset 200 or its associated electrical equipment.

The genset protection regime established for gensets, such as genset 200, may vary depending on the particular characteristics of the genset. Further, the genset protection regime can be established in view of mitigating or preventing damage to the genset itself resulting from failures or faults that manifest as short circuits. In addition, depending on the type of genset, the period (duration) for which the genset can withstand a short circuit may vary. The ability of the genset to withstand such damage can be represented by thermal damage curves which indicate the amount of current and duration of a current flow that can be carried by a particular system without resulting in failure (or a shortening of system life). During "normal" short circuit or high current operation when the arc flash protection regime is not activated, the genset generally attempts to "ride through" the event, until a thermal damage limit has been reached. This "ride through" is typically implemented to allow downstream coordinated sub-systems (such as circuit breakers or other controls) to operate first, minimizing overall system power flow disruption (as opposed to the major system disruption of genset shutdown and restart).

Figure 2:
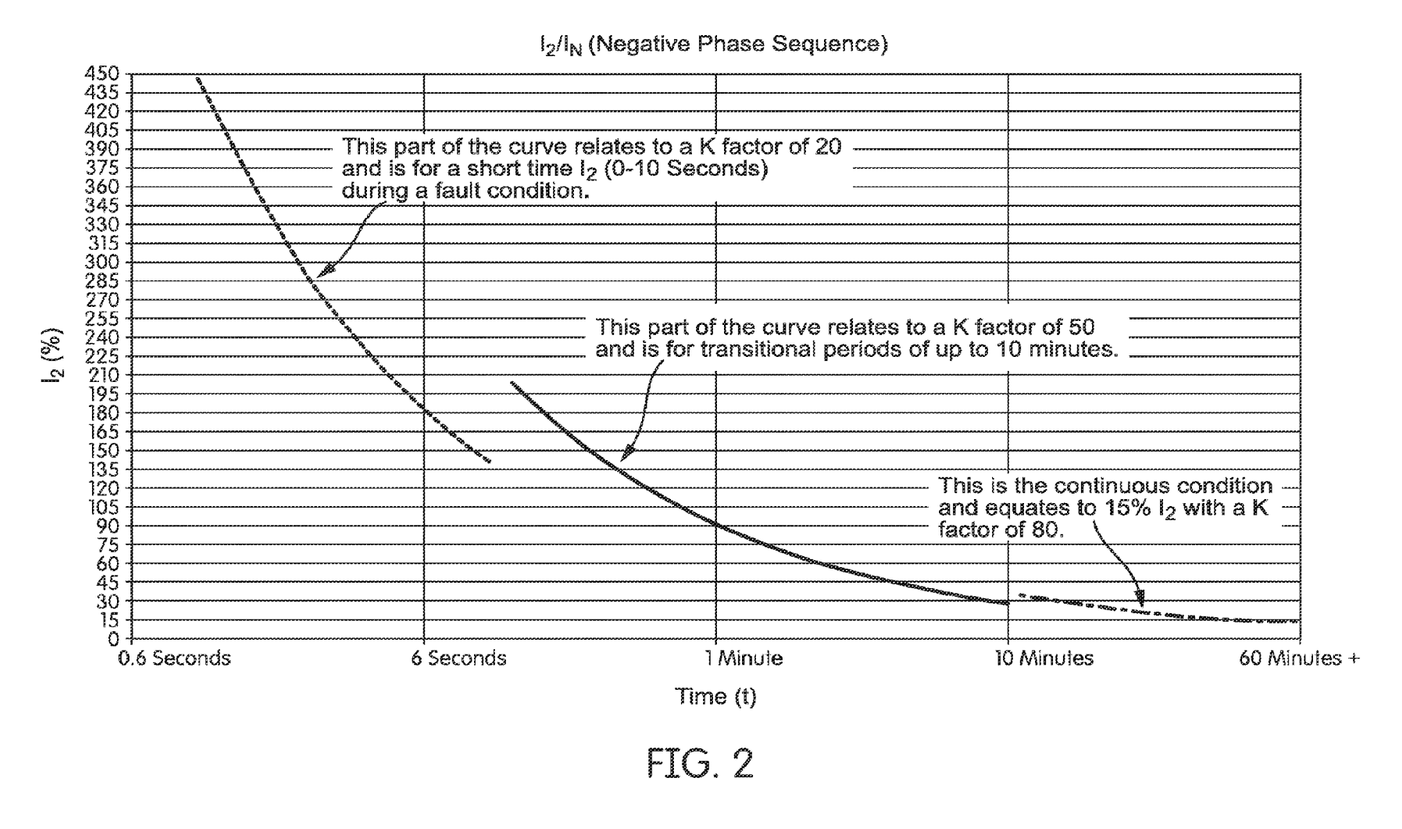
FIG. 2 depicts an example of a thermal damage curve for a genset, according to an embodiment.

In some embodiments, a genset can be characterized by an $I^2$ thermal damage curve. FIG. 2 depicts an example of a thermal damage curve for a genset. The thermal damage curve sets the physical limit of what the genset can output in power and time before needing to shutdown or reduce output to prevent damage to the alternator. It is noted that $I^2$ thermal damage curves are typically utilized for L-L or L-L-L short circuit events and that other thermal damage curves or limits can be used or substituted, such as the use of strict time limits for L-N short circuit events. This physical limit, however, as noted above can often be long enough to sustain an arc flash event for a significant period of time before the genset shuts down or reduces output, time that can be harmful of personnel or other entities that are in proximity of the genset or coupled equipment that may be experiencing the arc flash, even if protective gear is utilized. On larger machines of over approximately 1000 kVA, arc flash calculations indicate that even a 40 Cal/cm2 arc flash protection suit will not be able to protect operators from arc flash hazards due to the time that the machine is permitted to drive into a short circuit. As such, a different arc flash protection regime or related maintenance mode that operators could use during troubleshooting/commissioning to limit the time the genset control is allowed to drive into a short circuit and reduce it to an almost instantaneous detection and removal of excitation while people are working on the machine or other situation qualifying for arc flash protection is detected or indicated.

Based on the type of short circuit, the arc flash protection device 10 can limit the allowable time duration and current until implementing genset shut down. For example, arc flash protection device 10 can limit the allowable time duration to a selected duration and/or current threshold for any single phase to neutral fault, any given phase to phase fault, or for any fault crossing all three phases of a genset output.

FIG. 2 depicts a short circuit diagnostic logic table (or thermal damage curve) according to an embodiment. As mentioned above in reference to FIG. 1, the genset 200 comprises an automatic voltage regulator ("AVR") 220. When a phase of the genset 220 is short circuited, the AVR 220 is in a mode such as a current regulation mode (as opposed to voltage regulation mode, which is active during normal non-overloaded operation), and the short-circuited phase has a current exceeding a first threshold. The AVR is in the current regulation mode whenever a phase has a percentage of current above a capped limit (i.e., a second threshold). The logic table shown in FIG. 2 is an example of the logic that may be implemented in connection with such thresholds for the phases of the genset.

In embodiments of the present invention, either a genset thermal protection regime or an arc flash protection regime is instituted when a heavy current draw (potential short circuit) is detected, depending if personnel or other qualifying arc flash protection even t is detected in proximity to the genset or its associated equipment. In various embodiments of the present invention, a genset (or coupled system) is considered short circuited when for a line-neutral (L-N) or line to ground short circuit event at least one leg has exceeded 300% current (L1/L2/L3), and no other leg is greater than 150% genset standby current. For line to line (L-L) short circuits, a genset (or coupled system) is considered short circuited when at least one leg has exceeded 300% current (L1/L2/L3) and two legs are greater than 150% genset standby current. For line to line to line (L-L-L) short circuits, a genset (or coupled system) is considered short circuited when at least one leg has exceed 300% current (L1/L2/L3) and three legs are greater than 150% genset standby current.

Figure 3:
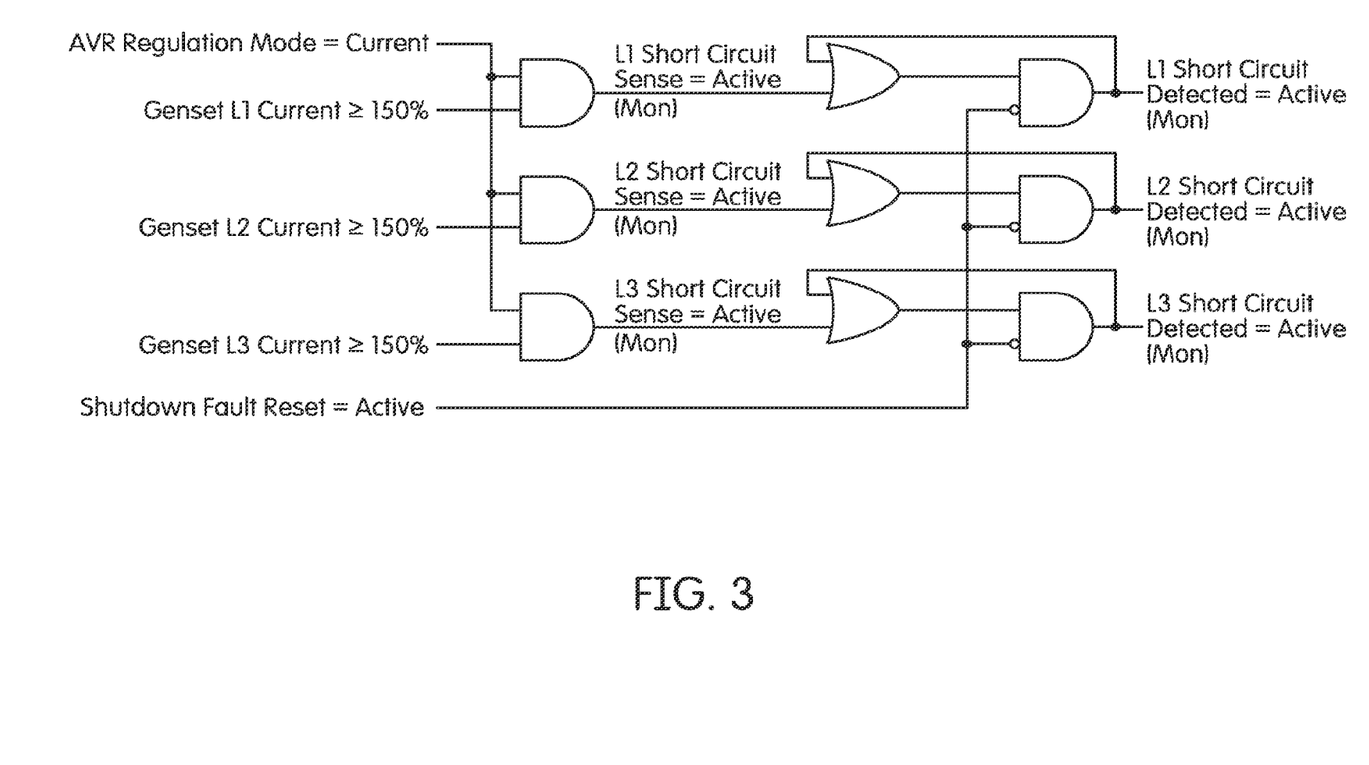
FIG. 3 depicts a logic diagram for detecting short circuits according to another embodiment.

FIG. 3 depicts a logic diagram of a short circuit detection circuit according to an embodiment of the present invention. The logical scheme shown in FIG. 3 may be implemented, for example, by the controller 110 or by other hardware or software solutions. It is noted that other methods of detecting a short circuit are possible and contemplated, for example, determining if the AVR's output is excessively high. In FIG. 3, the timing logic detects if the genset 200 (and AVR 220) are in current regulation mode (and thus the genset 200 is outputting a high current under heavy load, for example >=300% in one embodiment). It also detects if any one of the phases is at a short circuit output level (for example >=150% in one embodiment). If a short in any one of the phases is detected while the genset 200 is in a current regulation mode the event is latched into a latch circuit (formed by the feedback signal from the output AND-gates and the input of the OR-gates). The output of the latches indicate that a short circuit has been detected in the associated phase (either L1, L2, L3) and can cause the timer 120 to be initiated counting down to genset 200 shutdown if in genset thermal damage protection mode, or trigger immediate genset 200 shutdown if in arc flash protection mode. The latch signal serves to prevent the timing logic from restarting if it fluctuates between shorts in one, two or three phases.

The latch signal can also cause differing increments of time to be saved by the timer 120 if different types of short circuits occur and the AVR 220 is in the current regulation mode. The reset signal also causes the timer 120 to reset if the AVR 220 changes to a voltage regulation mode or a fault reset is active. If not in the arc flash protection regime, once timer 120 runs down, the timer 120 'output' represents a condition in which the genset 200 is considered to be overheated and genset 200 shutdown is required. Alternatively, if a person or other protected entity or event is detected in proximity to the genset 200 or associated electrical equipment, the arc flash protection regime is engaged and an AmpSentry maintenance mode of operation is entered where the time increment utilized by the timing logic when a potential arc flash producing short circuit is detected is reduced to zero or other brief time increment so that the genset 200 reacts immediately or in a very short time period to initiate shutdown when detection of a potential arc flash event indicated by a short circuit.

Figure 4:
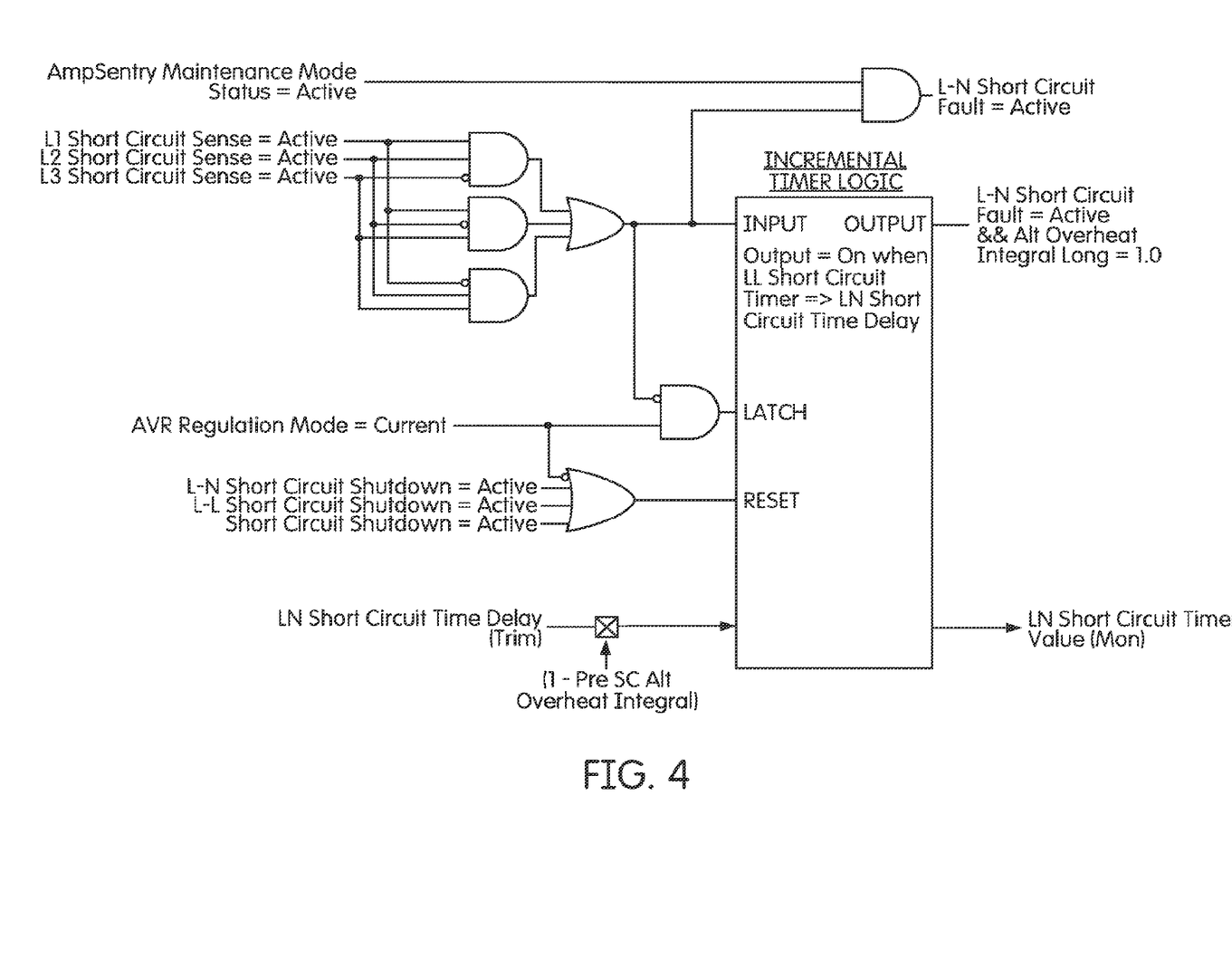
FIG. 4 shows a logic diagram with a short circuit time delay for a single phase according to an embodiment.
Figure 5:
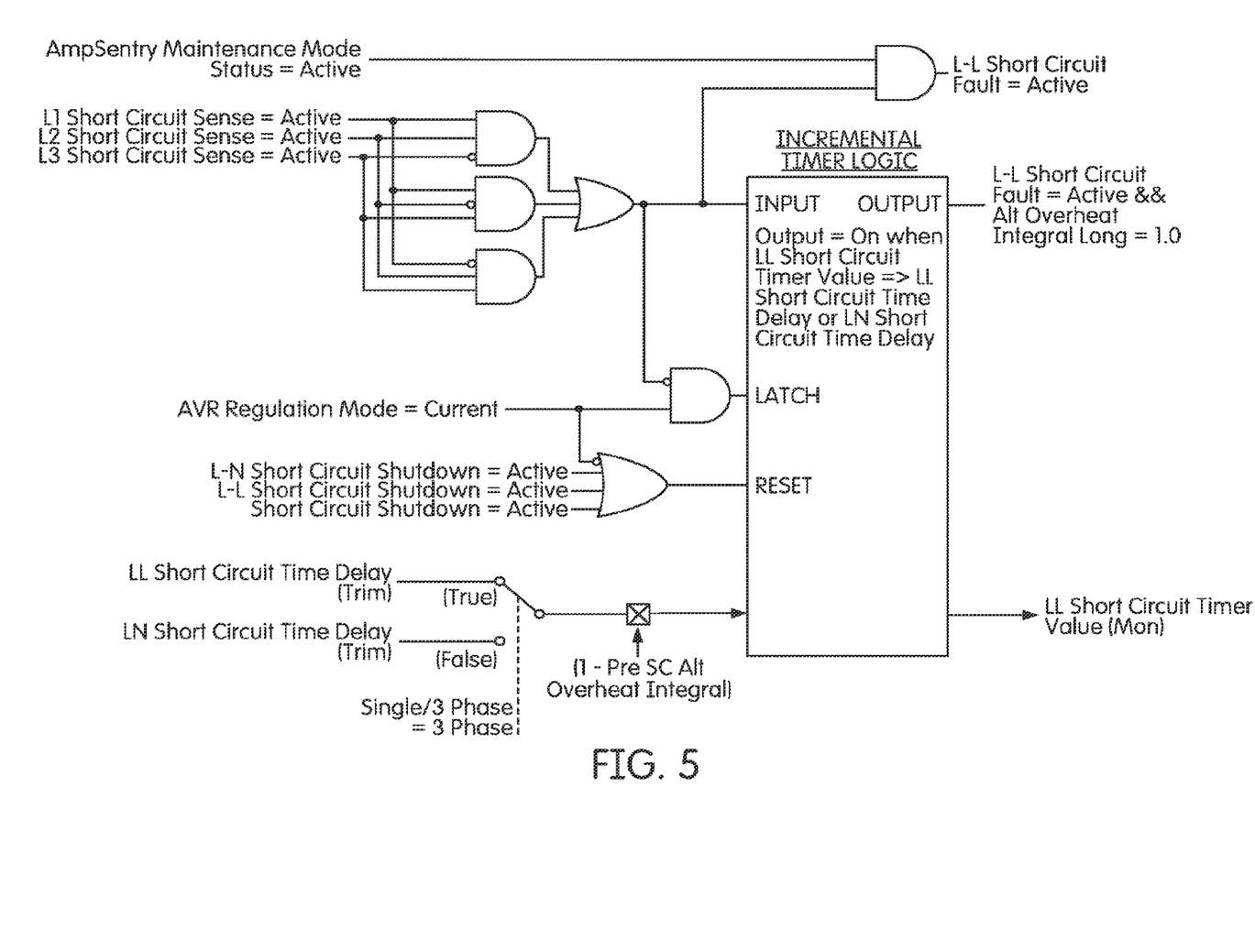
FIG. 5 depicts another logic diagram with a short circuit time delay input for two phases, according to an embodiment.

FIGS. 4 and 5 depict example logic diagrams and the associated latch circuit for detecting the type of short circuit (L-N, L-L, or L-L-L shorts) indicated by the short detection circuit of FIG. 3 and directing the correct response or latch value according to embodiments of the present invention. As with the circuit of FIG. 3, it is noted that other methods of detecting the short circuit type are possible and contemplated.

The circuit of FIG. 4 detects specific instances of line to neutral (L-N) shorts with a sequence of AND gates with inverted and non-inverted inputs from the short circuit detection circuit of FIG. 3 and indicates via an OR of the results that only a single phase is shorted to neutral (a L-N short has occurred). If the genset 200 AVR 220 is in current regulation mode (the genset is >=300% load) and a L-N short has been detected a selected timer value from the genset damage curve of FIG. 2 is latched into the timer and the timer initiated. Once the timer expires a genset 200 overload condition is indicated and the genset initiates shutdown or other appropriate response. Alternatively, if the arc flash protection regime has been engaged and AmpSentry Maintenance mode entered, the circuit of FIG. 4 immediately indicates a short circuit fault via an AND gate that logically AND's the AmpSentry Maintenance mode status signal and the L-N short indication signal output from the OR gate, triggering an immediate genset 200 shutdown. The timer of FIG. 4 is reset if the genset 200 has entered shutdown or the AVR 220 leaves current regulation mode.

The circuit of FIG. 5 detects specific instances of line to line (L-L) shorts with a sequence of AND gates with inverted and non-inverted inputs from the short circuit detection circuit of FIG. 3 and indicates via an OR of the results that a phase to phase short has occurred (a L-L or L-L-L short). As with the circuit of FIG. 4, if the genset 200 AVR 220 is in current regulation mode (the genset is >=300% load) and a L-L short has been detected a selected timer value from the genset damage curve of FIG. 2 is latched into the timer and the timer initiated. Once the timer expires a genset 200 overload condition is indicated and the genset initiates shutdown or other appropriate response. Alternatively, if the arc flash protection regime has been engaged and AmpSentry Maintenance mode entered, the circuit of FIG. 5 immediately indicates a short circuit fault via an AND gate that logically AND's the AmpSentry Maintenance mode status signal and the L-L short indication signal output from the OR gate, triggering an immediate genset 200 shutdown. The timer of FIG. 5 is reset if the genset 200 has entered shutdown or the AVR 220 leaves current regulation mode. The protection provided for each phase may differ, as noted above, particularly with respect to the conditions required to set the input signal and for use of the values stored in the timer 120 for three phase or a single-phase application. In some embodiments, the timing delays of FIGS. 4 and 5 are selected to account for pre-heating of (existing heat in) the components of the genset 200 before the short/heavy load incident occurs.

As appreciated from FIGS. 3-5, the protection regime of some embodiments can be implemented according to logical elements for the various components of the apparatus 1. Further, in some embodiments, the arc flash protection device 10 is configured to initiate the protection regime under given conditions. Such conditions can include, for example, a service or diagnostic tool being connected to the genset 200 or the arc flash protection device 10 or a manual input on a control panel or switch. Once the service tool is disconnected or manual input ceases, the controller 110 of the arc flash protection device 10 can impose a time delay until the arc flash protection regime is deactivated (i.e., terminated). In some embodiments, the arc flash protection regime is initiated when a switch or other external input device is active such that inputs can be entered into the genset 200 via an interface for detection. In one embodiment, when an external input from an outside source is active, the genset 200 is placed in the arc flash protection regime. Such inputs can include, but are not limited to, a signal from an enclosure door switch, a proximity sensor, a tag out indicator on a piece of associated electrical equipment, a maintenance mode protection regime indication from another genset, circuit breaker, or automatic transfer switch (ATS) that is in networked communication with the genset 200.

In other embodiments, the genset is one of a plurality gensets, ATS switches, or other electrical equipment paralleled together and in communication with each other that cooperate (via networked communications or signal wires or other signaling method) to establish a system wide arc flash protection regime upon detection of personnel in proximity to any one of the plurality gensets, ATS switches, or other electrical equipment, or upon being initiated by an outside signal. In these networked arc fault protection regimes, upon detection of an arc fault all gensets coupled to the local grid stop power production and immediately shutdown, all ATS switches and/or associated electrical equipment open to a neutral or predetermined safe position. In these networked embodiments, when the sensor 130 of any genset or a proximity sensor of any associated electrical equipment detects the presence of personnel or other arc flash protection afforded entity or event in arc flash proximity to itself or detects the presence of personnel through input to any local electrical equipment or genset controls or through the usage of a plug-in diagnostic control, all gensets coupled to the local grid and all ATS switches and/or associated electrical equipment are configured to initiate an arc flash protection regime. In some embodiments where not all of the local (typically paralleled) genset, ATS switches, and associated electrical equipment have an arc flash protection mode or an equivalent maintenance mode the genset 200 or controller 110 can send a shutdown command via the network or other local signal lines to the other non-arc flash protection mode enabled devices to also shut them down or place them in a safe or neutral mode of operation when a potential arc flash event is detected. In some embodiments, when the genset protection regime is underway and the AVR 220 is in the current regulation mode, the genset 200 will immediately trigger a short circuit shutdown fault when the arc flash protection regime is additionally engaged due to personnel being detected in close proximity or when another arc flash protection mode trigger event or signal occurs.

In some embodiments, the arc flash protection device 10 is provided with a diagnostic suite of tools so as to facilitate a determination of which particular phase is shorted. Further, when the arc flash protection regime is underway, an indication to this effect can be provided in a display of the service tool which can connect to the arc flash protection device 10 or genset 200. In addition, in some embodiments, the controller 110 is configured to override the built-in protection requirements and to activate the arc flash protection regime when the selected conditions noted above occur. The override capability can be automatically reset and the genset thermal protection regime reactivated (and the arc flash protection regime deactivated) when one or more of the maintenance diagnostic tool is removed, manual control panel or switch input cease, a timeout occurs, or the short circuit is no longer present on the genset 200 outputs.

Figure 6:
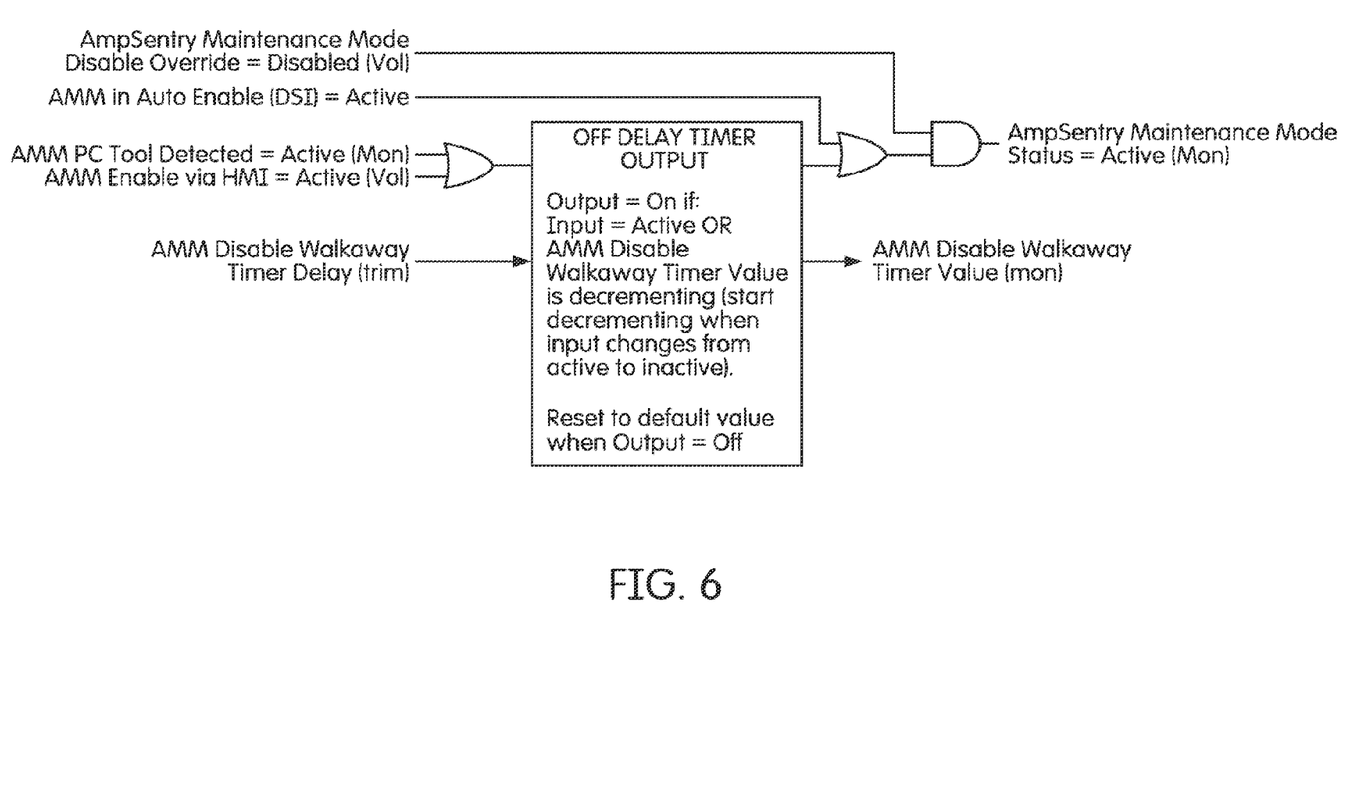
FIG. 6 depicts a logic diagram for an embodiment in which a protection regime is implemented, according to an embodiment.

FIG. 6 depicts an example logic diagram for an embodiment in which an arc flash protection regime as described above with proximity detection is implemented. It is noted that other logic circuits for implementing an arc flash protection regime with proximity detection are possible and contemplated. The arc flash protection regime allows for an instantaneous shutdown of the genset 200 to prevent personnel from being exposed to arc flash. The protection regime can, in some embodiments, be initiated by toggling a configurable switch. Further, the protection regime accounts for situations in which short circuit events are likely to be induced, such as during large in-rush current events as can be seen when large electric motors start. To avoid false alerts or shutdowns (i.e., situations in which the protection regime is implemented and the genset 200 is shut down after detection of a short circuit, but where, in reality, no such short circuit occurs), the capability to override the shutdown is provided. For example, in some embodiments, the controller 110 is provided with a manually-operable override switch or control panel function. In certain embodiments, the override function can be disabled, such as when a user manually adjusts a trim level and during a power cycle or processor reset. It is noted that in these override cases a positive confirmation is generally required from the operator to override the arc flash protection regime. It is further noted that the override function can be coupled with a timeout that restores the arc flash protection regime if a selected amount of time has passed and the personnel or other arc flash protection triggering event is still sensed in proximity to the genset 200.

Figure 7:
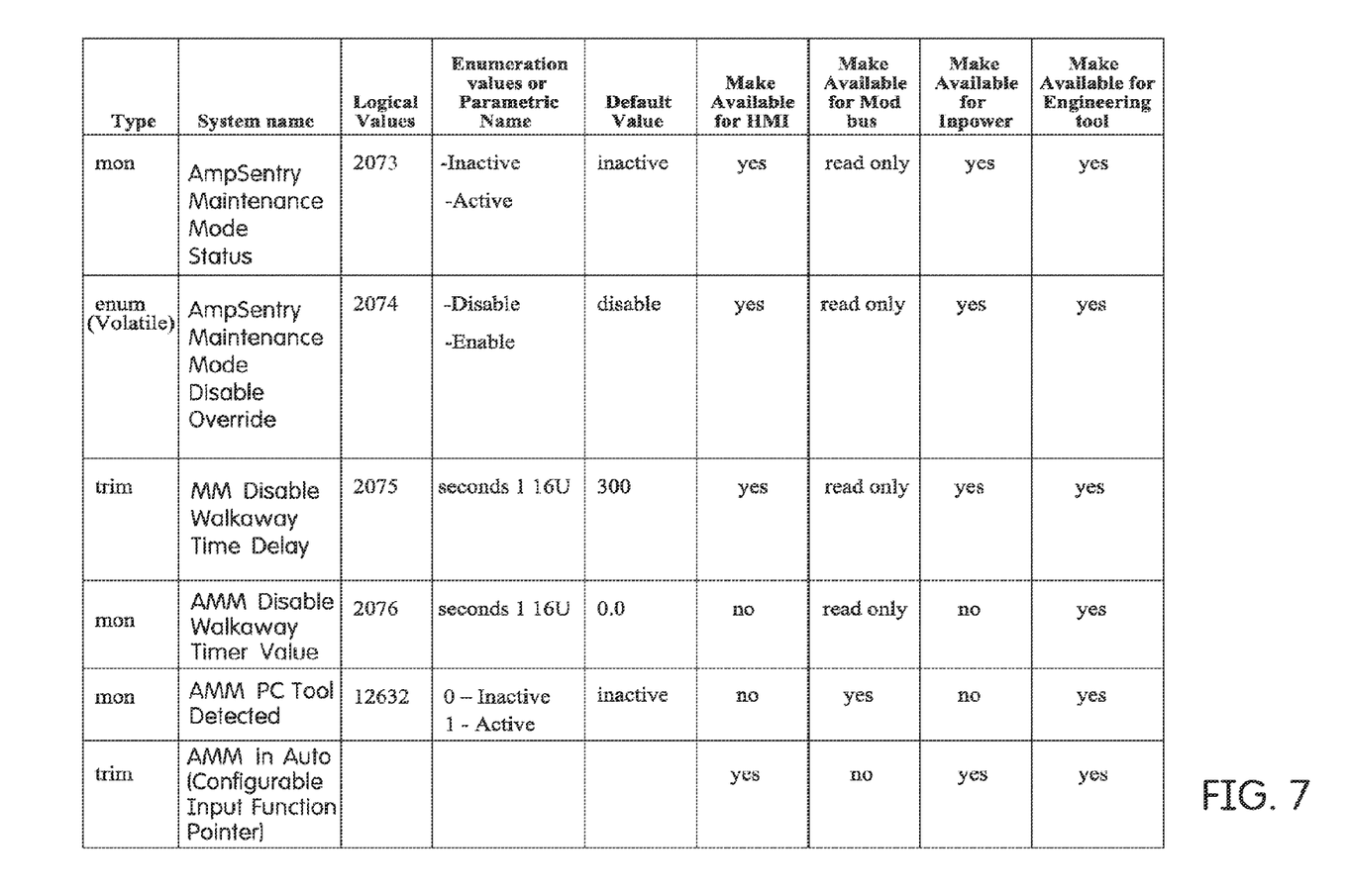
FIG. 7 depicts a table of inputs to be used in the protection regime according to the embodiment shown in FIG. 6.

Further, the logic diagram shown in FIG. 6 can be implemented in certain embodiments so as to allow for personnel to walk away from the genset 220 while the protection regime remains underway. In other words, under circumstances such as when the genset 200 is running in a manual mode or after the service tool is disconnected, the protection regime persists until such time as personnel may be well out of the way of the genset 200 and potential arc flash danger. By allowing for the protection regime to remain in effect for an additional amount of time, the safety of personnel and the apparatus 1 can be enhanced. FIG. 7 depicts a table of inputs for implementation in the protection regime.

In some embodiments, the protection regime comprises a maintenance mode that operators may use during troubleshooting/commissioning to reduce the time a controller (such as the controller 110 of the arc flash protection device 10 of FIG. 1) is allowed to drive into a short circuit so as to effectuate an instantaneous detection and removal of excitation. In further embodiments, the arc flash protection device 10 may further provide overload and/or thermal protection to the genset. Furthermore, in some embodiments, the protection regime prevents an operator from clearing a fault code on the genset that is associated with a short circuit until the cause of the fault (as associated short circuit) has been eliminated.

The protection regime may also incorporate procedures based on best practices following a short circuit event. For example, the protection regime of certain embodiments may require the genset to run without a load for a certain duration of time following a short circuit so as to cool the genset. Further, the amount of time required to cool down an engine or alternator of the genset before it can be either be safely shut down or quickly restarted may differ based on whether the genset is running (allowing for a running cool down) or has been stopped.

Further, in some embodiments, protection through a device such as the arc flash protection device 10 described above allows for protection against arc flash from short circuits in both a single-phase AC alternator configuration and a three-phase AC alternator configuration. It is noted that DC generator arc flash protection regimes are also contemplated, where the genset produces one or more DC current outputs instead of one or more AC phases, and the DC genset is shutdown to avoid arc flash when a short circuit or other high current event is detected in the one or more DC outputs.

In various implementations, the controller 110 is configured to restore the genset thermal protection regime and reset the timer 120 upon cessation of the arc flash protection regime. The controller 110 may also be configured to initiate the maintenance mode and enable the arc flash protection regime in accordance with a user-defined event profile. The user-defined event profile may reflect a specific operational environment or particular parameters for a given maintenance scenario or application, for example. In some embodiments, the controller 110 is configured so as to bypass a default protection program (e.g., the arc flash protection regime) and to control the genset 200 in accordance with a user override or a user-defined protection program.

In some implementations, the genset 200 may be disposed in a network of a plurality of gensets. In some embodiments, the controller 110 is configured to facilitate communication between the genset 200 (which is subjected to the arc flash protection regime) and at least one other genset (not shown) or associated electrical equipment that is not subjected to the arc flash protection regime, or, alternatively, to another genset or piece of associated electrical equipment that is also subjected to the arc flash protection regime, where the second genset or piece of associated electrical equipment is either coupled to the first genset or in close proximity. In such embodiments, the controller 110 may be configured so as to terminate or enable the arc flash protection regime for the genset 200 when the genset 200 becomes connected to another genset or piece of associated electrical equipment, depending if the arc flash protection regime is disabled or if the arc flash protection regime is coupled with the arc flash protection regime of the second genset or piece of associated electrical equipment.

Additionally, in some embodiments, the maintenance mode may be activated by operation of a switch outside of the genset 200. The controller 110 may be configured to implement an override so as to prevent a shutdown of the genset 200, as noted above. Thus, even if a short-circuit event is detected so as to trigger a shutdown of the genset 200 under the arc flash protection regime, the controller 110 can be configured to preclude shutdown.

Further still, the controller 110 may be configured to activate the maintenance mode and initiate the arc flash protection regime when the genset 200 is connected to an auxiliary device during at least one of a troubleshooting session or a servicing session. The auxiliary device may include, for example, computer equipment or a testing apparatus. The controller 110 may be further configured to identify a phase of the current. Also, the controller 110 may be configured to discriminate between a 1-phase condition, a 2-phase condition, and a 3-phase condition or a phase to neutral/ground condition.

Figure 8:
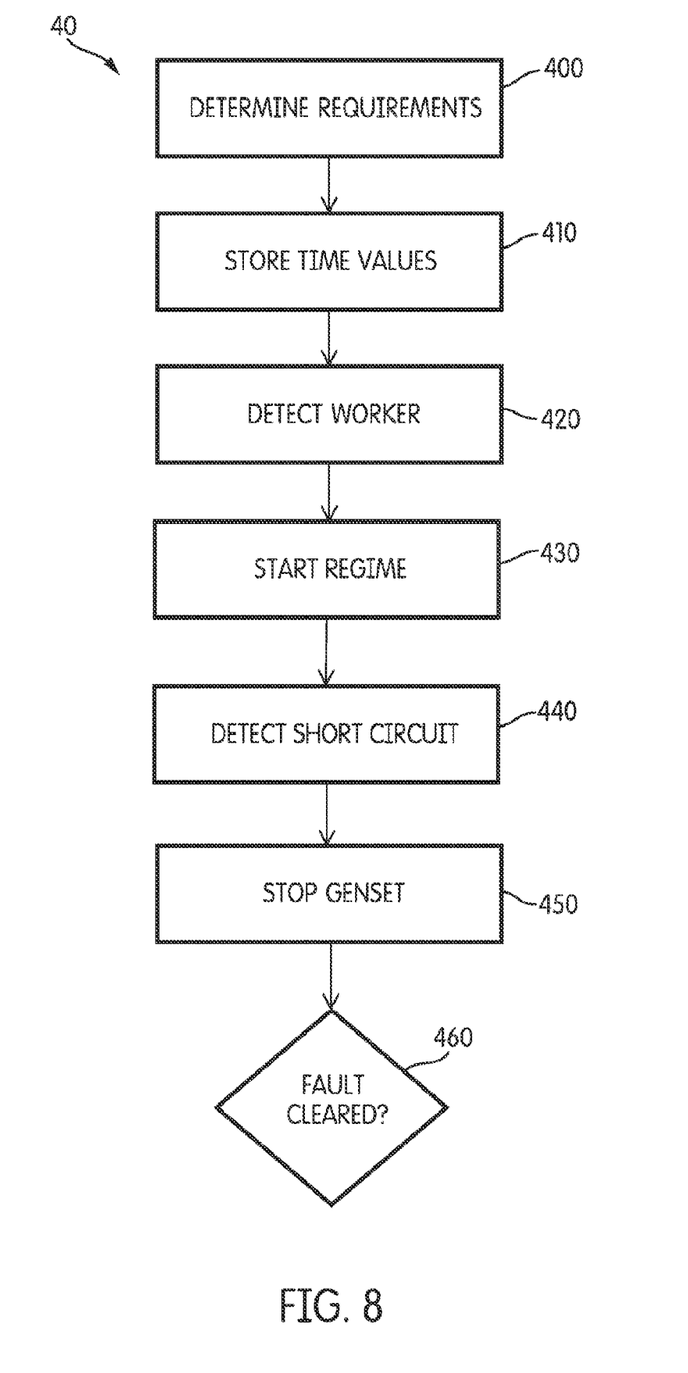
FIG. 8 is a flowchart illustrating a method according to an embodiment.

FIG. 8 depicts a flow diagram of a method 40 for providing protection against arc flash for a genset such as genset 200 shown in FIG. 1. At 400 in FIG. 8, genset protection requirements for a genset such as genset 200 are ascertained. At 410, time values are stored for a timer such as the timer 120 shown in FIG. 1. The time values may be derived based on the genset protection requirements determined in step 400, such as from the genset's thermal damage curve, but may also be adjusted in accordance with various protection techniques. At 420, the presence of a person (e.g., an employee who has been tasked with investigating or troubleshooting a previously identified fault with the genset) or other arc flash protection triggering event or signal is detected. As noted above in regard to FIG. 1, the method 40 may be implemented with people such that a person is detected once he or she is within a given range of the genset.

Referring again to FIG. 8, at 430, an arc flash protection regime is initiated and the genset protection regime canceled or reduced as a result of the detection in step 420. The arc flash protection regime implements changes in the operation of the genset 200 so as to further enhance its safety. Once the arc flash protection regime is underway, the method involves determining whether a short circuit is occurring, as shown at 440. If a short circuit is detected, then the genset 200 is shut off, as shown at 450. Once the genset 200 is shut off, the method involves keeping the genset 200 in an off state until the fault has been cleared. As shown at 460, the method 40 includes determining whether the fault has been cleared or the cause of the short removed. If it has not been cleared, the genset is forced to remain off.

The examples and embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. An arc flash protection device for a generator set, the arc flash protection device comprising:
    a sensor configured to detect a presence of at least one person or arc flash protection qualifying event in proximity to the generator set; and
    a controller configured to shutdown the generator set upon detection of a short circuit and the generator set reaching a limit on a thermal damage curve for the generator set;
    wherein the controller is also configured to initiate an arc flash protection regime when the presence of the at least one person or arc flash protection qualifying event is detected, the arc flash protection regime including shutting down the generator set upon detection of a short circuit, and
    wherein the controller is further configured to identify a phase condition for the short circuit and to discriminate between a 1-phase condition, a 2-phase condition, and a 3-phase condition.

2. The arc flash protection device of claim 1, wherein the protection regime is initiated when the generator set is started or controlled manually through a control panel or input device associated with the generator set.

3. The arc flash protection device of claim 1, wherein the protection regime is initiated when the generator set is connected to a diagnostic tool.

4. The arc flash protection device of claim 1, wherein the controller is configured to facilitate communication between the generator set subjected to the protection regime and at least one other generator set or piece of associated electrical equipment.

5. The arc flash protection device of claim 1, wherein the controller is configured so as to bypass a default arc flash protection program and to control the generator set in accordance with a user-defined arc flash protection program.

6. The arc flash protection device of claim 1, wherein the arc flash protection regime is activated by operation of a switch outside of the generator set.

7. The arc flash protection device of claim 1, wherein the controller is configured to implement an override so as to prevent a shutdown of the generator set.

8. The arc flash protection device of claim 1, wherein the sensor is configured to detect the presence of at least one entity within a predetermined distance from the generator set.

9. The arc flash protection device of claim 1, wherein the controller is configured to activate the arc flash protection regime when the generator set is connected to an auxiliary device during at least one of a troubleshooting session or a servicing session.

10. A method for providing protection from arc flash for a generator set, the method comprising:
    sensing a presence of at least one entity in proximity to the generator set; and
    initiating an arc flash protection regime when the presence of the at least one entity is detected within the predetermined distance, the arc flash protection regime comprising:
    shutting down the generator set upon detection of a short circuit,
        wherein the controller is further configured to identify a phase condition for the short circuit and to discriminate between a 1-phase condition, a 2-phase condition, and a 3-phase condition.

11. The method of claim 10, further comprising initiating the arc flash protection regime when the generator set is started manually.

12. The method of claim 10, further comprising communicating between the generator set subjected to the arc flash protection regime and at least one other generator set or associated electrical power equipment.

13. The method of claim 10, further comprising bypassing a default arc flash protection program and controlling the generator set in accordance with a user-defined arc flash protection program.

14. The method of claim 10, wherein the sensing of the presence of the at least one entity in proximity to the generator set comprises sensing the presence of the at least one entity within a predetermined distance from the generator set.

15. An apparatus comprising:
    an arc flash protection device including:
        a sensor configured to detect a presence of at least one entity in proximity to the generator set;
        a timer configured to store at least one value corresponding to a predetermined adjustable delay time; and
        a controller configured to initiate an arc flash protection regime when the presence of the at least one entity in proximity to the generator set is detected, the protection regime comprising shutting down the generator set automatically upon detection of a short circuit;
    at least one generator set, the at least one generator set being configured to connect to the arc flash protection device; and
    an automatic voltage regulator,
    wherein the controller is further configured to identify a phase condition for the short circuit and to discriminate between a 1-phase condition, a 2-phase condition, and a 3-phase condition.

* * * * *